May 22, 1923.
I. D. RICHHEIMER
COFFEE INFUSER
Filed March 27, 1922
1,456,010
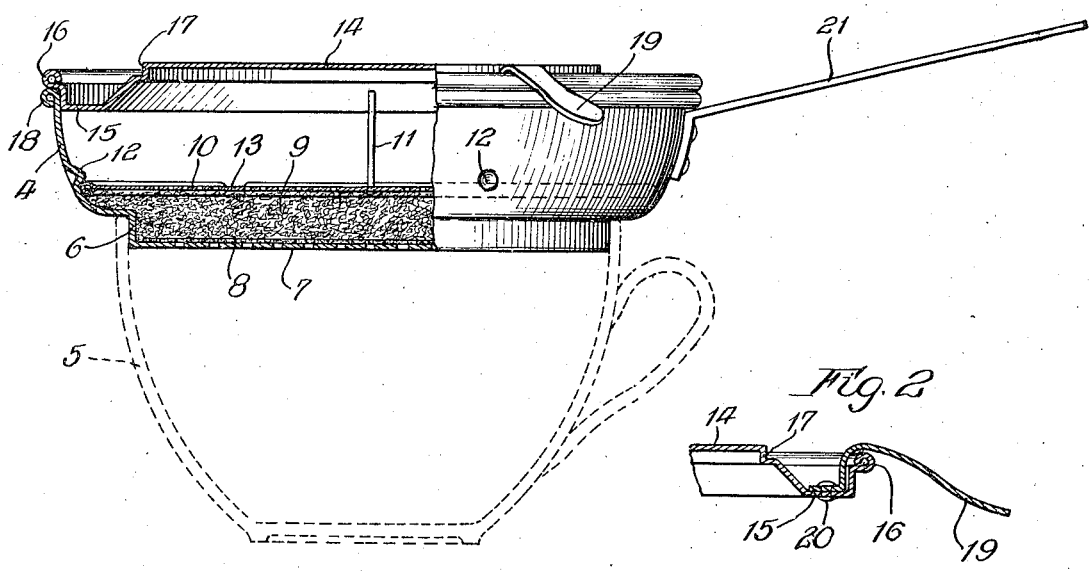
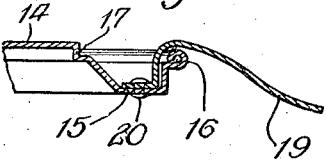
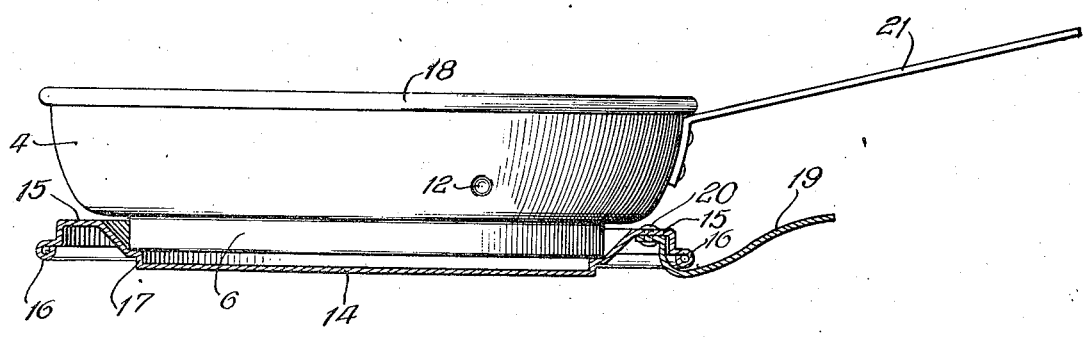
Inventor:
Isaac D. Richheimer
By: Wm. O. Belt
Atty.

Patented May 22, 1923.

1,456,010

UNITED STATES PATENT OFFICE.

ISAAC D. RICHHEIMER, OF NEW YORK, N. Y.

COFFEE INFUSER.

Application filed March 27, 1922. Serial No. 547,210.

*To all whom it may concern:*

Be it known that I, ISAAC D. RICHHEIMER, a citizen of the United States, residing at New York city, in the county of New York and State of New York, have invented certain new and useful Improvements in Coffee Infusers, of which the following is a specification.

My invention has for its object to provide a simple and compact device for use in connection with a coffee cup to prepare a cup of coffee of superior quality and without the use of other devices.

It is also the object of my invention to provide an infusing device for individual use so that anyone may always prepare a cup of coffee of uniform quality and of a standard strength suitable to the individual taste and desire.

I have illustrated a simple and convenient embodiment of the invention in the accompanying drawings in which—

Fig. 1 illustrates the infuser partly in section arranged in place upon a coffee cup shown in broken lines;

Fig. 2 is a sectional view of a portion of the cover; and

Fig. 3 shows the cover in section and arranged to support the receptacle and to catch the drip therefrom after the cup of coffee has been made.

Referring to the drawings 4 is a comparatively shallow receptacle which is shaped and proportioned to fit easily upon the top of a coffee cup 5. The lower portion 6 of the receptacle is preferably reduced in size to fit in the coffee cup and it is provided with a perforated bottom 7 over which a filter paper 8 is placed to support the coffee 9 and prevent it from passing through the perforations in the bottom 7. A perforated plate 10 having a handle 11 is adapted to be arranged upon the coffee 9 and this plate not only acts as a water spreader to distribute the water throughout the charge of coffee, but it also serves to hold the coffee with sufficient compactness to prevent the particles thereof from floating and moving about while the water is percolating through the coffee to and through the filter paper. The receptacle has one or more indentations 12 to hold the plate upon the charge of coffee and the plate has one or more notches 13 to enable the insertion and removal of the plate.

The cover has a flat centrally disposed section 14 of extended area, a depressed annular ring 15 and a beaded edge 16 all stamped from a single metal sheet. The flat central portion 14 is provided as a supporting surface to rest upon a table top when the cover is arranged in position for supporting the receptacle as shown in Fig. 3 and this central portion is of an area slightly less than that of the bottom so that the receptacle may rest upon an annular shoulder 17 surrounding the flat central portion 14. The annular shoulder 17 connects the central flat portion 14 with the depressed ring 15. It will be noted that the receptacle is held with its perforated bottom 7 spaced away from the flat portion 14. In this position any drippings from the receptacle will be retained upon the portion 14 within the annular shoulder 17. The depressed ring 15 fits snugly within the open top of the receptacle 4 and the beaded ring 16 fits snugly upon the open beaded edge 18 of the receptacle whereby the cover is snugly fitted upon the receptacle in coffee infusing position shown in Fig. 1 to confine the contents of the receptacle and prevent the escape of the steam or aroma therefrom.

I prefer to make all the parts of the device from sheet aluminum by stamping or otherwise and this enables me to easily construct the parts so that the cover may be fitted very snugly upon the receptacle. To facilitate the removal of the cover from the receptacle I provide the cover with a handle 19 which is preferably bent over the beaded edge 16 and fastened by rivets 20 to the cover at the bottom of the depressed ring 15. This handle is preferably bent downward from the flat central portion 14 so that in inverted position of the cover as shown in Fig. 4 this handle will project upward so that it can be easily grasped. The receptacle is also provided with a suitable handle 21 and I have found that the cover may be readily removed from the receptacle, even when it sticks tightly, by pressing the handle 19 towards the handle 21 thereby causing the cover to move rotatably and break the frictional joint which may have been produced by their engagement.

My invention provides a very simple and compact device which can be produced at comparatively low cost, for infusing a cup of coffee and it enables the making of coffee by the cup of uniform quality and of standard strength. A sufficient charge of ground coffee is placed upon the filter paper in the bottom of the receptacle, then the spreader plate is arranged in place in the receptacle and then the receptacle is placed upon a coffee cup and filled with boiling water after which the cover is arranged in place and the infusing allowed to proceed. The resulting coffee is clear, rich and of a strength determined by the quantity of ground coffee employed; if the same proportions of ground coffee and water are always used, and the coffee is of the same quality, the resulting cup of coffee will always be of uniform strength and quality. The infuser is a convenient device for travelers, and its compact size and shape enables it to be conveniently carried in a small bag or packed in a trunk.

I have shown and described my invention in what I now conceive to be its preferred form but I reserve the right to make all changes in the construction and arrangement and proportion of parts as may come within the scope of the accompanying claims.

I claim:

1. A coffee infusing device comprising a receptacle open at the top and having a perforated bottom, and a cover adapted to engage said top for closing the receptacle, said cover having a substantially flat central portion of extended area, a depressed ring between the central portion and the edge of the cover, and an annular shoulder between the depressed portion and the central portion, said annular shoulder forming a support for the receptacle when the cover is arranged in inverted position and spacing the bottom of the receptacle from the central portion of the cover.

2. A coffee infusing device comprising a receptacle open at the top, a handle for the receptacle, a cover having a substantially cylindrical surface adapted to frictionally engage a like inner surface of the receptacle to seal the receptacle, and a handle fastened to the cover and adapted to be employed together with the first handle to break the seal.

3. A coffee infusing device comprising a receptacle having a handle and open at the top, a cover adapted to engage said open top for closing the receptacle and having a depressed ring to fit within the receptacle and a beaded edge to engage the edge of the receptacle, and a handle fastened to the cover in the depressed ring thereof and projecting over the beaded edge outwardly from the cover.

4. A coffee infusing device comprising a receptacle adapted to receive a charge of ground coffee and a quantity of water, said receptacle being open at the top and having a perforated bottom, a perforated plate arranged on the charge of coffee in the receptacle, and a cover adapted to engage said open top for closing the receptacle, said cover having a beaded edge, a substantially flat central portion of extended area, a depressed ring between the edge and the central portion, and an annular shoulder between the depressed portion and the central portion, said annular shoulder forming a support for the receptacle when the cover is arranged in inverted position and spacing the bottom of the receptacle from the central portion of the cover.

5. A coffee infusing device comprising a receptacle open at the top and having a perforated bottom and a cover adapted to engage said open top for closing the receptacle, said cover having a substantially flat central portion of extended area and an annular shoulder surrounding said flat central portion, said annular shoulder forming a support for the receptacle when the cover is arranged in inverted position and spacing the bottom of the receptacle from the central portion of the cover.

ISAAC D. RICHHEIMER.